United States Patent [19]

Wu et al.

[11] Patent Number: 5,894,836

[45] Date of Patent: Apr. 20, 1999

[54] COMPOUND SOLAR WATER HEATING AND DEHUMIDIFYING DEVICE

[75] Inventors: Wei-Yih Wu; Shyi-Min Lu, both of Hsinchu, Taiwan

[73] Assignee: Industrial Technology Research Institute, Hsinchu, Taiwan

[21] Appl. No.: 09/062,730

[22] Filed: Apr. 20, 1998

[30] Foreign Application Priority Data

Apr. 26, 1997 [TW] Taiwan ............................. 86206658

[51] Int. Cl.[6] ................................................. F24J 2/34
[52] U.S. Cl. ............................ 126/617; 126/631; 126/676
[58] Field of Search ............................ 126/617, 619, 126/631, 676

[56] References Cited

U.S. PATENT DOCUMENTS 4,441,484 4/1984 Greiner ................................ 126/619
4,867,134 9/1989 O'Brien ................................ 126/617

*Primary Examiner*—Carroll B. Dority
*Attorney, Agent, or Firm*—Smith, Gambrell & Russell; Beveridge, DeGrandi, Weilacher & Young Intellectual Property Group

[57] ABSTRACT

A compound solar water heating and dehumidifying device including an adsorption bed disposed at a lower rim of a plate type heat collector of a solar water heating element for causing a heat collector element to absorb heat in the day-time and the adsorption bed to regenerate and accumulate heat. At night, the heat of adsorption and heat of condensation are released to the heat collector element to retard the drop of temperature of water in water channels that are in contact with the heat collector element. Therefore, dissipation of heat from the hot water in a water tank may be retarded and water moisture may be removed.

20 Claims, 4 Drawing Sheets

COMPOUND SOLAR WATER HEATING AND DEHUMIDIFYING DEVICE

BACKGROUND OF THE INVENTION

1. Field of the Invention

The present invention relates generally to a solar water heating device, and more particularly to a compound solar water heating and dehumidifying device which may slow down dissipation of heat from a water tank and which has the functions of a dehumidifier.

2. Description of the Prior Art

Solar water heating systems generally fall into three main types, namely, the natural circulation type, the forced circulation type, and the storage type. In the natural circulation type, a working fluid, i.e., water, is caused to circulate between a water tank and water channels of a plate type heat collector by utilizing the siphon phenomenon, without requiring a motor to pump the water. In this system, cold water in the water channels on the heat collector absorb the sun's radiant heat on the plate surfaces so that the temperature of the water rises while the density thereof drops. Hence, hot water rises up to the water tank via a water conduit. This is the so-called siphon phenomenon.

At the same time, the water that is originally stored in the water tank and has a lower temperature and density will flow downwardly to the water channels on the heat collector to be subject to the sun's heat and undergo heat transfer. The siphon action is therefore repeated to cause water stored in the water tank to be heated and circulated in natural cycles.

In the above-described natural circulation type of solar water heaters, a certain volume of water continuously absorbs solar energy in the day-time via the heat collector, and the heated water is caused to flow upwardly to the water tank by siphon action. But with the continuous rise of the temperature of water inside the water tank, the siphon effect will slow down. Besides, heat loss will increase due to augmentation of the temperature difference between the heat collector and the ambient air. Therefore, at noon time when sunlight is most intense, the heat collecting efficiency and the rise of water temperature will tend to slow down. In the afternoon when sunlight becomes less intense, it is possible that the heat collecting efficiency will drop rather than rise, and the temperature of water in the water tank will no longer climb. Instead, the water temperature will fall as a result of the drop in heat collecting efficiency. This problem is especially obvious when sunlight is not stable, or on overcast days, or at night.

In view of the above, it can be seen that, with the conventional plate type solar heater, the heat accumulation capacity of the water tank is quite restricted even when the sky is clear and sunlight is normal. In sum, as the temperature of hot water in the water tank will rise to its peak when the sun's light is most intense but will drop when the sun's light becomes less intense, and as the temperature difference between water in the tank and the ambient air leads to heat dissipation, conventional solar water heaters cannot effectively utilize solar energy for at least one third of the day even when sunlight is normal. In particular, at night time when the temperature difference between water in the tank and the ambient air becomes greater and there is the radiant heat effect, the heat collector will become a means for dissipating heat rather than accumulating heat, which will more directly reduce the solar energy collected in the day-time.

SUMMARY OF THE INVENTION

A primary object of the present invention is to provide a solar water heater to help retard the quick dissipation of heat of hot water in a water tank.

Another object of the present invention is to provide a solar water heater in combination with a dry chamber, in which the adsorption agents of an adsorption bed may be regenerated by the sun in the day-time and the adsorption bed may be utilized for removing water moisture at night.

In order to achieve the above-mentioned objects, a compound solar water heating and dehumidifying device, comprising: a solar heat collector element having a plurality of water channels; a water tank having a water conduit transferring the hot water form the solar heat collector element to the water tank; and an adsorption bed in the lower rim of the heat collector element for accumulating the solar energy in the day-time and releasing the energy for maintaining the water temperature in the water channels and retard the drop of temperature in the water tank.

An air channel is defined between a lower rim of the adsorption bed and a heat insulation element. The air channel may have an air current impeller disposed therein to urge the flow of air currents so that there is a greater air current but less pressure inside the air channel to facilitate the carrying away of water moisture from the adsorption bed. The air current impeller may be driven by solar batteries during the day and by municipal electricity via an ac/dc converter during the night. In this way, the adsorption bed may be regenerated and used for dehumidification.

Preferably, the air channel of the present invention is directly or indirectly connected to a dry storage chamber or a dry chamber. The adsorption bed may be utilized to dry or dehumidify the dry storage chamber. The dry storage chamber may be used to remove water moisture from articles stored therein, whereas the dry chamber may be used for drying clothes.

When the present invention operates in the day-time, it may be used to heat water in a water tank, reduces dissipation of heat from hot water, and contributes to the regeneration of the adsorption agents to thereby enhance the overall solar heat collecting efficiency. When the present invention operates at night, in addition to supplying hot water, it may be used to dry the air inside they dry chamber by means of regenerated adsorption agents of the adsorption bed. The present invention has the dual functions of a solar water heater and a dehumidifier. When the present invention operates, the switching of air gates is utilized to control the adsorption bed to regenerate in the day-time and to communicate with the dry chamber to perform indoor closed circulation at night. There is further provided an auxiliary dehumidifier that assists the adsorption bed to remove water moisture in the day-time. The adsorption agents may be in the form of grains adhered to the plate type heat collector or a honeycomb plate structure immersed in or coated with adsorption agents to form the adsorption bed.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
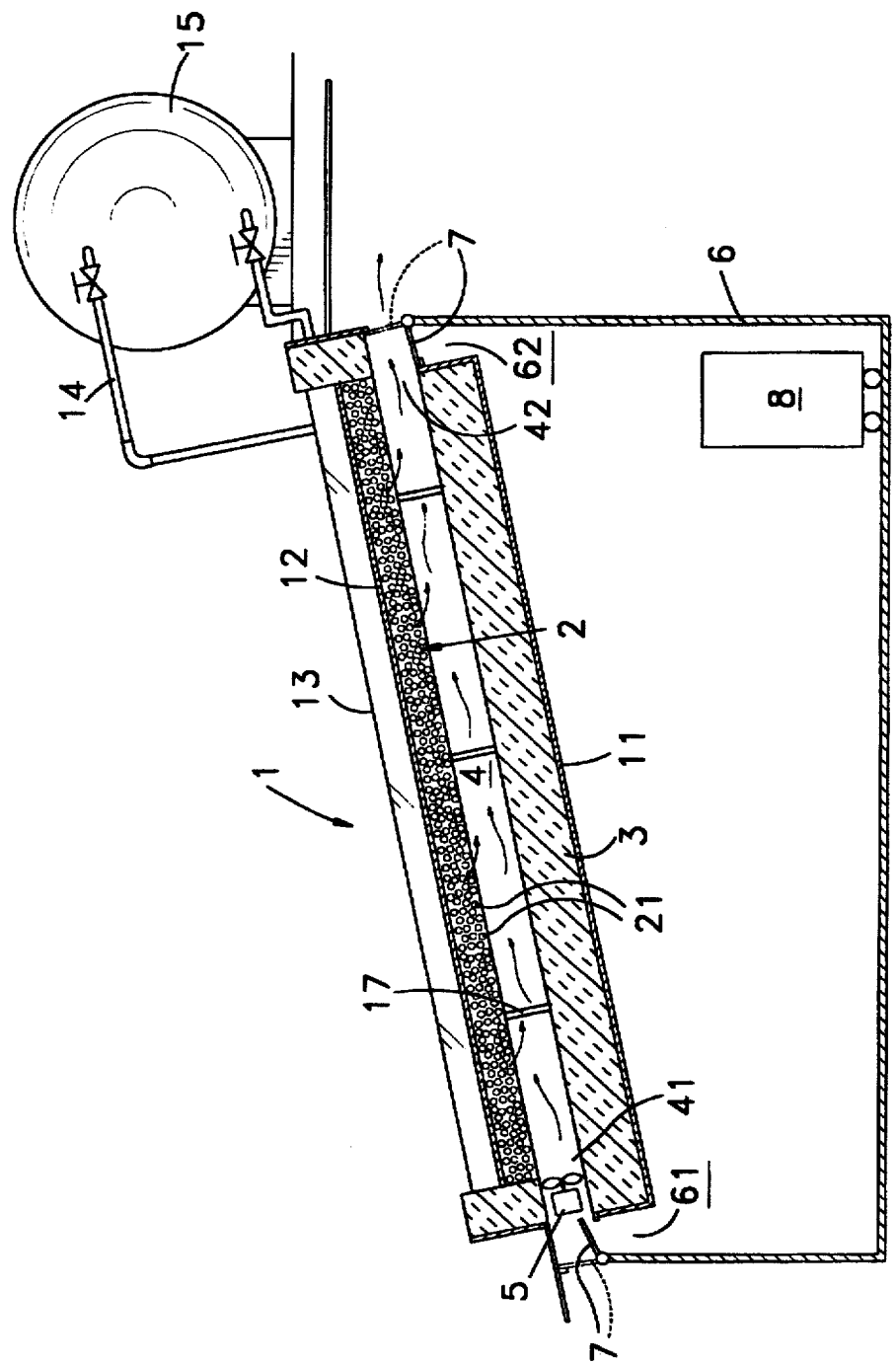
FIG. 1 is a structural sectional view of the solar water heater of the present invention.

With reference to FIGS. 1–6, a compound solar water heating and dehumidifying device, comprising: a solar heat collector element 12 having a plurality of water channels 16; and a water tank 15 having a water conduit 14 transferring the hot water form said solar heat collector element 12 to the water tank 15. The device of the present invention further comprising an adsorption bed 2 in the lower rim of the heat collector element 12 for accumulating the solar energy in the day-time and releasing the energy for maintaining the water temperature in the water channels 16, and retard the drop of temperature in the water tank 15.

An air channel 4 may be provided between a lower rim of the adsorption bed 2 and a heat insulation element 3, and an air current impeller may be provided inside the air channel 4. By using the air current impeller 5 to urge the flow of air inside the air channel 4, a greater air current and less pressure will be generated inside the air channel 4 so that water moisture in the adsorption bed 2 may be easily carried away. The air current impeller 5 may be driven by solar batteries in the day-time and driven by municipal electricity via an ac/dc converter at night. In this way, the adsorption bed 2 may be regenerated and remove dampness.

Preferably, the air channel 4 may directly or directly communicate with a dry storage chamber or a dry chamber 6, and the adsorption bed 2 may be utilized to dry the dry chamber 6.

When the present invention operates in the day-time, it may be used to heat water in a water tank, reduces dissipation of heat from hot water, and contributes to the regeneration of the adsorption agents to thereby enhance the overall solar heat collecting efficiency. When the present invention operates at night, in addition to supplying hot water, it may be used to dry the air inside the dry chamber by means of regenerated adsorption agents of the adsorption bed 2. It can therefore be appreciated that the present invention has the dual functions of a solar water heater and a dehumidifier. The examples described hereinafter will explain the technical means, objects, and effects of the present invention.

Figure 2:
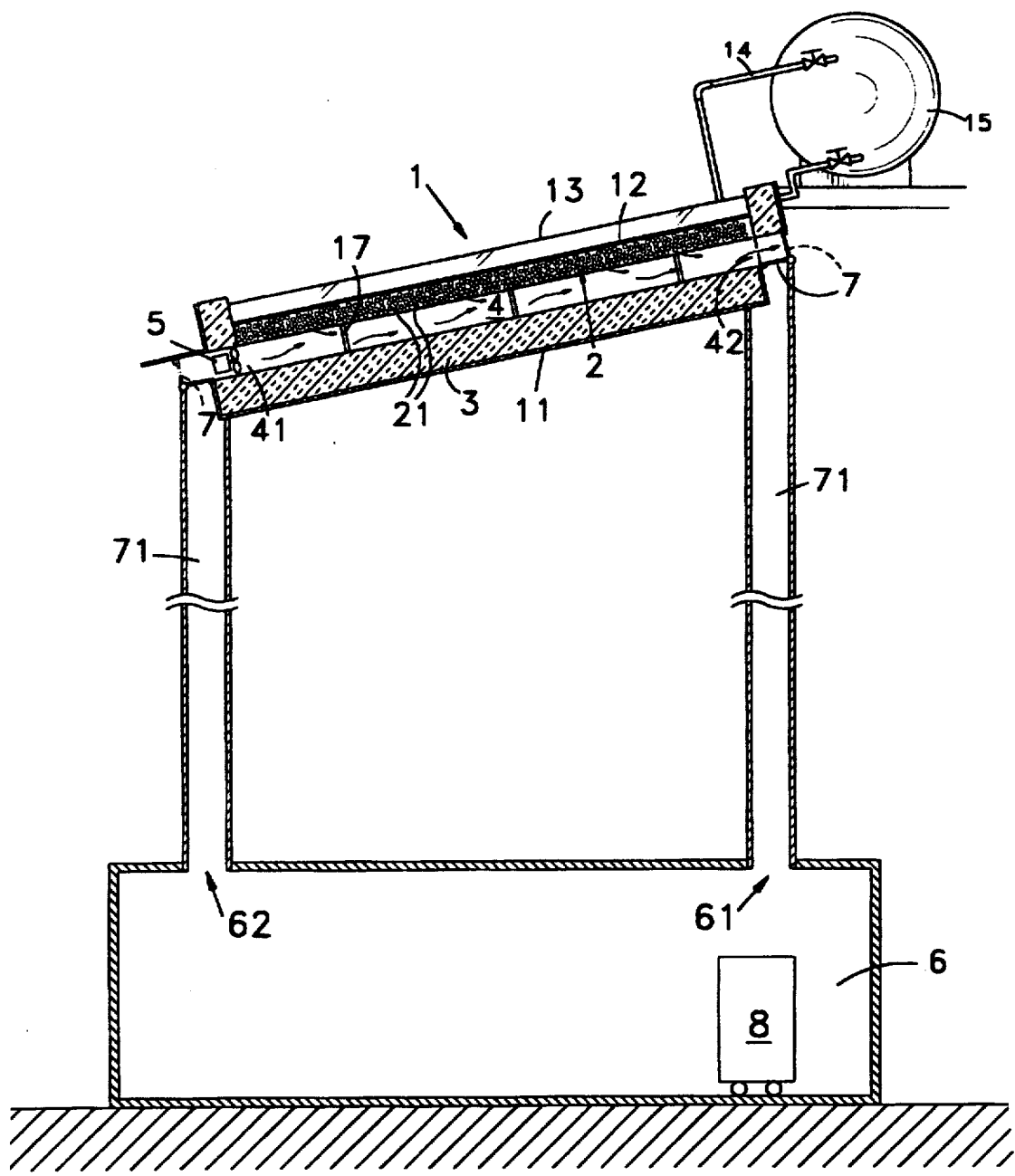
FIGS. 2 and 3 are similar to FIG. 1, but showing different embodiments.
Figure 3:
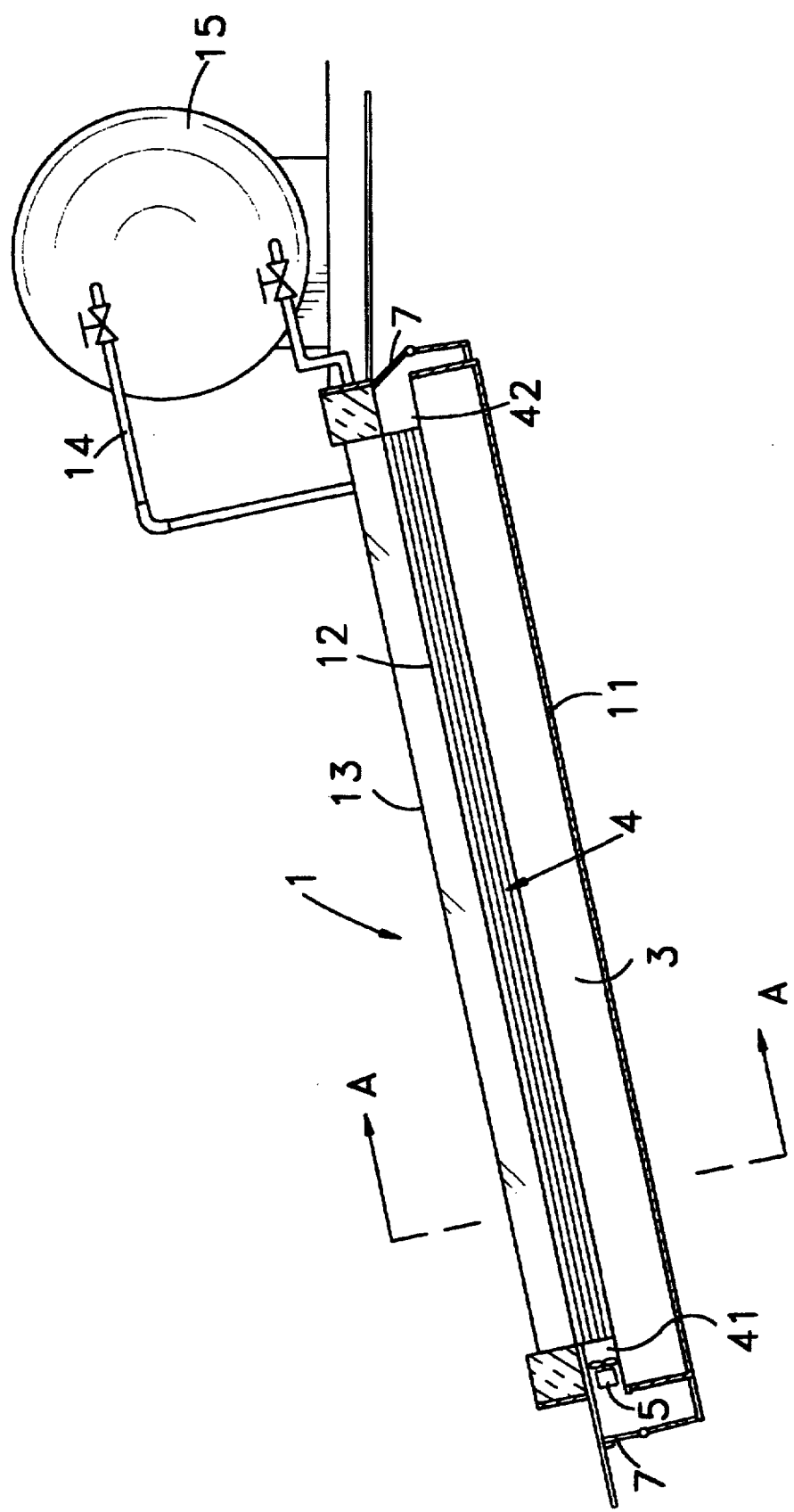
Figure 4:
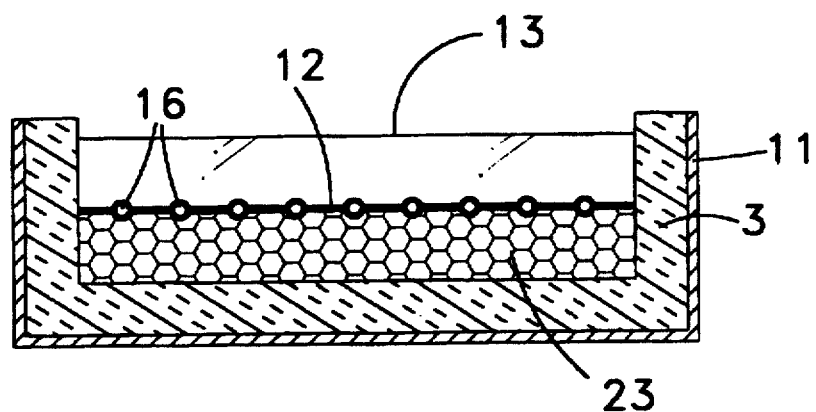
FIG. 4 is a sectional view taken along line A—A of FIG. 3, showing the adsorption bed in the form of a honeycomb structure.
Figure 5:
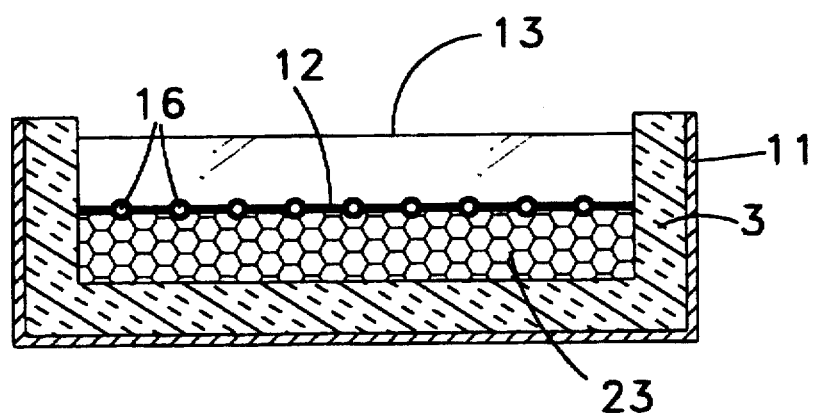
FIG. 5 is a schematic view of a first preferred embodiment of the adsorption bed of FIG. 4.
Figure 6:
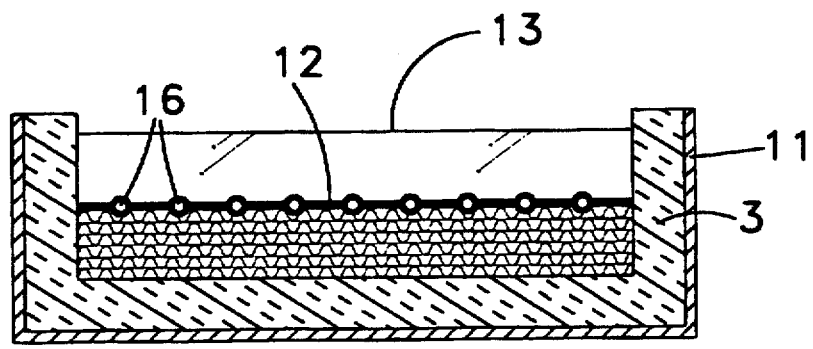
FIG. 6 is a schematic view of a second preferred embodiment of the adsorption bed of FIG. 4.

FIG. 1 shows a first preferred embodiment of the present invention. A solar water heating element 1 and a dry chamber 6 are stacked as one. FIG. 2 shows a second preferred embodiment of the present invention, illustrating that the solar water heating element 1 and the dry chamber 6 may be installed separately at suitable places. Certainly, the solar water heating element 1 is preferably installed at a place where there is abundant sunlight, such as the roof. FIGS. 3 and 4 show that an adsorption bed 2 is disposed inside the solar water heating element 1 and has honeycomb-shaped passages 23. In general, the adsorption agents are coated to a substrate. FIGS. 5 and 6 are schematic views of other examples of the honeycomb-shaped passages.

The present invention is characterized in that the adsorption bed 2 is contiguous to the lower rim of the solar heat collector element 12. The upper rim of the heat collector element 12 is in contact with a plurality of water channels 16 evenly distributed thereon. The temperature of water in the water channels 16 is maintained by means of the heat released by the adsorption bed 2 at night. Due to its heat adsorptivity and the adsorption agents regenerated thereby in the day-time, the adsorption bed 2 may effectively absorb water moisture in the air, and the heat of condensation thus generated may also release heat to the heat collector element 12 by conduction or radiation. Therefore, the temperature of water inside the water channels 16 that are in contact with the heat collector element 12 will not drop abruptly. The water channels 16 communicate with a water tank 15 via a water conduit 14 so that hot water may flow from the water channels 16 via the water conduit 14 into the water tank 15 utilizing the siphon phenomenon. As the water channels 16 receive the heat of adsorption and the heat of condensation at night, quick dissipation of heat from water in the water channels 16 may be retarded. The hot water temperature in the water channels 16 helps prevent dissipation of heat from the water conduit 14 and the water tank 15. The present invention may slow down quick heat dissipation from the water tank 15 through the water conduit 14, the water channels 16 and the heat collector element 12. It can therefore be appreciated that the present invention may solve the problem of quick heat dissipation from the water tank of conventional solar water heaters. The water tank 15 in the present invention further includes a heat insulation material to prevent quick heat dissipation.

Furthermore, there is an additional effect that the adsorption agents of the adsorption bed 2 may be regenerated by the sun in the day-time. At night when the temperature is relatively low, the adsorption bed 2 may be used to dehumidify the dry chamber and generate heat of condensation, which may further help to retard the dissipation of heat from the water channels 16.

With reference to FIGS. 1–6, an embodiment of the solar water heater accomplished by utilizing the above-stated characteristics comprises: a solar water heating element 1, including a plate type heat collector element 12; water channels 16 evenly distributed on the heat collector element 12 and capable of undergoing heat exchange therewith; a water tank 15 located above the solar water heating element 1; a water conduit 14 communicating with the water channels 16 to form a water circulation path; an adsorption bed 2 contiguous to a lower rim of the heat collector element 12; a plate type heat insulation element 3 located below the adsorption bed 2 and corresponding to the heat collector element 12 and the adsorption bed 2 in area, the heat insulation element 3 maintaining a suitable space from the adsorption bed 2 to thereby define an air channel 4 along which air may flow to the adsorption bed 2 for dehumidification or regeneration of adsorption agents 21; and an outer frame 11 for enveloping and securing the above components. In order to reinforce the structural strength so that the solar water heating element 1 and the adsorption bed 2 will not affect the air channel 4 due to their increased weight after prolonged use, a plurality of support elements 17 may be disposed between the adsorption bed 2 and the heat insulation element 3, and inside the air channel 4. The outer frame 11 and the support elements 17 together support the weight of the solar water heating element 1 and the adsorption bed 2. The air channel 4 has an air inlet 41 and an air outlet 42 and is in communication with the atmosphere. When the adsorption bed 2 regenerates in the day-time, since the adsorption bed 2 will absorb more water moisture than air by providing an air current impeller 5 inside the air channel 4 to force the movement of air therein, there will be a greater air current but less pressure inside the air channel 4 so that water moisture in the adsorption bed 2 may be carried away by the air current. The adsorption bed 2 hence may become regenerated and accumulate heat. At night, the night air contains more water moisture, and the adsorption bed 2 becomes relatively drier than air so that it will absorb water moisture. The adsorption bed 2 may then release the heat of adsorption and heat of condensation to continuously release heat to the water channels 16 via the heat collector element 12 so as to reduce the rate of dissipation of heat from the water channels 16.

In addition to the above-described characteristics, the present invention further has the function of a dehumidifier. In a preferred embodiment, the air channel 4 communicates with a dry storage chamber or a dry chamber 6 that need to be dried. The dry chamber 6 defines a space to be dried which is hereinafter referred to as a dry storage chamber. The dry storage chamber 6 has an air exit 61 and an air entrance 62 respectively communicating with the air inlet 41 and the air outlet 42 of the air channel 4. The air inlet 41 is connected to the air exit 61 directly as shown in FIG. 1 or indirectly as shown in FIG. 2 by means of an air channel element 71. The air outlet 42 communicates with the air entrance of the dry storage chamber 6. The two ends of the air channel 4 each have a three-way air gate 7. As shown by imaginary lines, the air channel 4 may be selectively connected to the atmosphere or the dry storage chamber by changing position. The dry storage chamber 6 may be directly provided on the solar water heating element 1 and tightly coupled thereto as an integral whole to serve purely as a dry space. As shown in FIG. 1, the top of the dry chamber 6 and the heat insulation element 3 of the solar water heating element 1 are integral.

In the present invention, the air gates are switched to communicate with the outside air to control the adsorption bed to regenerate during the day-time and are switched to communicate with the dry chamber to perform indoor closed circulation at night.

Furthermore, the dry chamber 6 may be provided with an auxiliary electric dehumidifier 8, and a relative humidity gauge may be utilized to automatically control the on/off of the dehumidifier 8. In the day-time when the adsorption agents regenerate, the dehumidifier 8 may be actuated to maintain the humidity inside the dry chamber 6.

The air current impeller installed in the air channel 4 may be a direct current fan. In the embodiments, the fan 5 is mounted at the air inlet. The fan 5 may be driven by solar energy in the day-time and driven by direct currents via an ac/dc converter at night. In the embodiments shown in FIGS. 3, 4 and 5, the air channel 4 may actually be combined with the adsorption bed 2. All the various honeycomb-shaped passages 23 shown in the drawings allow passage of air. The surface of the honeycomb structure is provided with adsorption agents (such as lithium chloride), which attach to the structure by substrate coating or packing. In the embodiments shown in FIGS. 1 and 2, the adsorption agents 21 are in the form of grains that adhere to the lower rim of the heat collector element 12 to form the adsorption bed 2. Generally speaking, the adsorption agents 21 that are used in the present invention may be any suitable dehumidifying agents such as silica gel, activated carbon, aluminum oxide, molecular sieve, bleached clay, etc. Among them, silica gel is most preferred. According to known techniques, silica gel can be formed from reacting sodium silicate with hydrochloric acid. Silica gel's internal porosity is more uniform and may be maintained at about 70%. Besides, silica gel has good water adsorptivity and is inexpensive, non-inflammable, and odorless. Furthermore, it requires a relatively low temperature to regenerate. Whether the adsorption agents are in the form of grains adhered to the heat collector or in the form of a honeycomb plate structure immersed in or coated with adsorption agents to form the adsorption bed, the above-mentioned objects of the present invention may still be achieved.

The above-mentioned honeycomb-shaped passages 23 are not limited to hexagonal structures. They may be wavy as shown in FIG. 5 or quadrilateral as shown in FIG. 6, or any shape. Basically, the honeycomb-shaped passages 23 in the present invention should have the following features: (1) All the passages are substantially parallel to each other;

(2) the tiers of passages are substantially equi-distantly spaced apart from each other; (3) they all orient towards a single direction; (4) they are all made of highly heat conductive substrate materials; and (6) the surface of the substrate is coated with adsorption agents.

In the day-time, the present invention utilizes solar batteries to drive the fan 5 mounted at the front or rear end of the adsorption bed such that the fan 5 is actuated only when the intensity of the sun has reached a certain degree, and the current of air generated by the fan 5 may be controlled with the change in the intensity of the sun's light so as to take the best advantages of the solar energy absorbed by the heat collector element 12. When sunlight is strong, the solar heat absorbed by the heat collector element 12 is more, and the heat absorbed by the adsorption agents of the adsorption bed 2 is therefore more. Hence, the water molecules adsorbed by the adsorption agents at night have greater release kinetic energy. At this time, the inlet and outlet of the air channel 4 directly communicate with the atmosphere, and the battery-driven fan 5 spins at a higher speed, providing a greater current of air for regeneration purposes. Besides, the pressure inside the air channel is relatively small, which may speed up regeneration of the adsorption agents. On the contrary, when sunlight is weak or there is no sunlight at all, the fan 5 will not operate to avoid further heat dissipation of the heat collector element 12 and cooling of the adsorption bed 2, which may lead to counter water absorption. In addition, the heat accumulation capacity of the adsorption bed 2 may also enhance the heat accumulation effect of the heat collector element 12.

Preferably, when operation of the present invention has become balanced and the air inside the dry chamber 6 has become relatively dry, the adsorption bed may be utilized as a heat accumulating element in addition to dehumidifying in the day-time, so that it may better maintain the water temperature at night when it releases heat.

When the present invention is used at night, apart from enabling the water tank 15 to supply hot water, the adsorption agents which have been regenerated in the day-time may perform its dehumidifying function. The fan 5, which is driven by solar batteries during the day, is driven by municipal electricity at night. By switching the air gates 7, the air channel 4 located below the adsorption bed 2 is controllable to dehumidify the dry chamber in an enclosed cycle and help keep the humidity inside the dry chamber low. Furthermore, an electric dehumidifier is arranged in the dry chamber to help keep the dry chamber dry during the day. When the adsorption bed 2 is proceeding with dehumidification at night, the heat of adsorption and heat of condensation thus generated may be conducted via the heat collector element 12 by heat conduction or radiation to the water 10 channels 16 near the heat collector element 12 or released to the outside. In this way, the adsorption bed 2 may be maintained at a low temperature state to achieve better adsorption efficiency, and the heat of the hot water in the water tank 15 may not quickly dissipate.

The solar heat collector element is substantially inclined, and the air inlet of the air channel is located at a lower position.

The above-described solar water heating element and the adsorption bed may be separately manufactured for assembly to the dry chamber. Certainly, they may be assembled to the dry chamber to become an integral device.

Although the present invention has been illustrated and described with reference to the preferred embodiments thereof, it should be understood that it is in no way limited to the details of such embodiments, but is capable of numerous modifications within the scope of the appended claims.

What is claimed is:

1. A compound solar water heating and dehumidifying device, comprising:
   a solar heat collector element having a plurality of water channels;
   a water tank having a water conduit transferring the hot water form said solar heat collector element to said water tank; and
   an adsorption bed in the lower rim of said heat collector element for accumulating the solar energy in the day-time and releasing the energy for maintaining the water temperature in said water channels and retard the drop of temperature in said water tank.

2. A compound solar water heating and dehumidifying device as defined in claim 1, wherein said adsorption bed is spaced apart from a heat insulation element by an air channel which allows passage of air to contact said adsorption bed.

3. A compound solar water heating and dehumidifying device as defined in claim 2, wherein said air channel has an air inlet and an air outlet, and an air current impeller being installed at said air inlet of said air channel.

4. A compound solar water heating and dehumidifying device as defined in claim 3, wherein said air current impeller is a direct current fan driven by solar batteries.

5. A compound solar water heating and dehumidifying device as defined in claim 3, wherein said air inlet and said air outlet are respectively connected to the atmosphere.

6. A compound solar water heating and dehumidifying device as defined in claim 3, wherein said air inlet and said air outlet are respectively connected to a dry chamber.

7. A compound solar water heating and dehumidifying device as defined in claim 6, wherein said air inlet or said air outlet has an air gate installed at where it is connected to said dry chamber.

8. A compound solar water heating and dehumidifying device as defined in claim 2, wherein said solar heat collector element is constituted by an outer frame which envelops said heat collector element, said adsorption bed, said air channel, and said heat insulation element.

9. A compound solar water heating and dehumidifying device as defined in claim 8, wherein said adsorption bed and said heat insulation element are supported by a plurality of supported elements.

10. A compound solar water heating and dehumidifying device as defined in claim 1, wherein the lower rim of said heat collector element has grain-like adsorption agents adhered thereto to form said adsorption bed.

11. A compound solar water heating and dehumidifying device as defined in claim 10, wherein said adsorption agents of said adsorption bed are chemical adsorption agents.

12. A compound solar water heating and dehumidifying device as defined in claim 10, wherein said adsorption agents are silica gel.

13. A compound solar water heating and dehumidifying device as defined in claim 1, wherein said adsorption bed is constituted by honeycomb-shaped passages, the surfaces of which have adsorption agents.

14. A compound solar water heating and dehumidifying device as defined in claim 3, wherein said solar heat collector element is substantially inclined, and said air inlet of said air channel is located at a lower position.

15. A compound solar water heating and dehumidifying device as defined in claim 14, wherein said water channels are connected in series and are inter-communicative.

16. A compound solar water heating and dehumidifying device as defined in claim 15, wherein said water channels are distributed on said solar heat collector element and are in contact therewith.

17. A compound solar water heating and dehumidifying device as defined in claim 1, wherein said water tank is located above said solar heat collector element.

18. A compound solar heating and dehumidifying device, comprising:
   a sealable dry chamber, having an interior defining a dry space, said dry chamber having an air entrance and an air exit; and
   a solar water heater device which comprising:
      a solar heat collector element having a plurality of water channels;
      a water tank having a water conduit transferring the hot water from said solar heat collector element to said water tank; and
      an adsorption bed in a lower rim of said heat collector element for accumulating the solar energy in the day-time and releasing the energy for maintaining the water temperature in said water channels and retard the drop of temperature in said water tank; and
      an air channel defined by said adsorption bed and a heat insulation element and adapted to allow passage of air to contact said adsorption bed;
      said air channel having an air inlet and an air outlet, said air inlet communicating with said air exit of said dry chamber, said air outlet communicating with said air entrance of said dry chamber.

19. A compound solar water heating and dehumidifying device as defined in claim 18, wherein said air inlet and said air outlet of said air channel are respectively provided with a three-way air gate whereby said air channel may be selectively controlled to communicate with the atmosphere or said dry chamber.

20. A compound solar water heating and dehumidifying device as defined in claim 18, wherein said dry chamber is internally provided with an auxiliary electric dehumidifier.

* * * * *